(12) United States Patent
Diaz et al.

(10) Patent No.: US 9,141,647 B2
(45) Date of Patent: Sep. 22, 2015

(54) CONFIGURATION PROTECTION FOR PROVIDING SECURITY TO CONFIGURATION FILES

(75) Inventors: Fabrice Diaz, Mougins (FR); Luc Margaron, Mougins (FR)

(73) Assignee: SAP SE, Walldorf (DE)

( * ) Notice: Subject to any disclaimer, the term of this patent is extended or adjusted under 35 U.S.C. 154(b) by 575 days.

(21) Appl. No.: 13/456,685

(22) Filed: Apr. 26, 2012

(65) Prior Publication Data

US 2013/0290708 A1 Oct. 31, 2013

(51) Int. Cl.
*H04L 29/06* (2006.01)
*G06F 17/30* (2006.01)
*H04L 12/24* (2006.01)

(52) U.S. Cl.
CPC .......... *G06F 17/30289* (2013.01); *H04L 41/28* (2013.01); *H04L 63/04* (2013.01); *H04L 63/08* (2013.01); *H04L 41/046* (2013.01)

(58) Field of Classification Search
CPC .................................................. G06F 21/6209
USPC .......................................................... 713/165
See application file for complete search history.

(56) References Cited

U.S. PATENT DOCUMENTS

| 7,929,702 B2 * | 4/2011 | Brown et al. ................. 380/277 |
| 8,601,603 B1 * | 12/2013 | Fleizach ......................... 726/29 |
| 2008/0016412 A1 * | 1/2008 | White et al. .................... 714/48 |
| 2008/0285759 A1 * | 11/2008 | Shaw ............................ 380/278 |
| 2010/0275251 A1 * | 10/2010 | Gross et al. ....................... 726/6 |
| 2011/0069834 A1 * | 3/2011 | Urbanik et al. ................ 380/28 |
| 2012/0215827 A1 * | 8/2012 | Rachitsky et al. ........... 709/202 |
| 2012/0324093 A1 * | 12/2012 | He ................................ 709/224 |
| 2013/0013931 A1 * | 1/2013 | O'Hare et al. ................ 713/189 |

* cited by examiner

*Primary Examiner* — Christopher Brown
(74) *Attorney, Agent, or Firm* — Brake Hughes Bellerman LLP

(57) ABSTRACT

The embodiments include a method for providing security for a set of configuration files corresponding to a remote monitoring application. The method may include accessing a server configured to store the set of configuration files. The server is also configured to receive a connection request, over a network, from an agent having the remote monitoring application, generate an encryption key in response to receiving the connection request, transmit the encryption key, over the network, to the agent, encrypt the set of configuration files according to an encryption algorithm and the encryption key, and transmit the encrypted set of configuration files to the agent. According to one embodiment, the server may be accessed by performing one or more maintenance actions on the server.

16 Claims, 7 Drawing Sheets

CONFIGURATION PROTECTION FOR PROVIDING SECURITY TO CONFIGURATION FILES

BACKGROUND

A solution manager diagnostics agent (e.g., a standalone program) may store and use configuration files stored on a file system associated with the solution manager diagnostics agent. The solution manager diagnostics agent may perform a series of tasks (e.g., monitoring, root cause analysis, data collection) on a productive system according to its configuration files, and then transmit the results, over a network, to a solution manager, which processes the results obtained by the solution manager diagnostics agent. However, the configuration files may include sensitive information such as password information. As such, the configuration files may require protection in order to prevent hackers from obtaining the sensitive information contained in the configuration files. Conventionally, the solution manger diagnostics agent may encrypt the configuration files using an encryption key provided by an administrator, and then store the encryption key on the file system. The encryption key may be valid until the administrator decides to change the encryption key (e.g., following the appropriate security policy), in which case the solution manager diagnostics agent may re-encrypt the configuration files. However, this conventional method does not provide a flexible protection mechanism, which can vary of a level of security depending on the user's requirements.

SUMMARY

The embodiments include a method for providing security for a set of configuration files corresponding to a remote monitoring application. The method may include accessing a server configured to store the set of configuration files. The server is also configured to receive a connection request, over a network, from an agent having the remote monitoring application, generate an encryption key in response to receiving the connection request, transmit the encryption key, over the network, to the agent, encrypt the set of configuration files according to an encryption algorithm and the encryption key, and transmit the encrypted set of configuration files to the agent. According to one embodiment, the server may be accessed by performing one or more maintenance actions on the server.

The server may be a solution manger diagnostics server. Also, the server may be configured to re-generate the encryption key and re-encrypt the set of configuration files each time the server receives the connection request. The server may be configured to periodically change a type of the encryption algorithm and a key size of the encryption key. The server may be configured to delete the encryption key after transmitting the encrypted set of configuration files. The server may be configured to authenticate the agent in response to receiving the connection request. The set of configuration files may include user password information and sensitive information.

The embodiments include a server for providing security associated with a set of configuration files of a remote monitoring application. The server includes a receiving unit configured to receive a connection request, over a network, from an agent having the remote monitoring application, an encryption key generation unit configured to generate an encryption key in response to receiving the connection request, a transmission unit configured to transmit the encryption key, over the network, to the agent, and an encryption unit configured to encrypt the set of configuration files according to an encryption algorithm and the encryption key. The transmission unit is configured to transmit the encrypted set of configuration files to the agent.

According to one embodiment, the encryption key generation unit may be configured to re-generate the encryption key and the encryption unit may be configured to re-encrypt the set of configuration files each time the receiving unit receives the connection request. Also, the encryption key generation unit may be configured to re-generate the encryption key and the encryption unit may be configured to re-encrypt the set of configuration files may include negotiating a type of encryption key and encryption algorithm. Further, the encryption unit may be configured to periodically change a type of the encryption algorithm and a key size of the encryption key. The encryption generation unit may be configured to delete the encryption key after the transmission unit transmits the encrypted set of configuration files.

The server may also include an authentication unit configured to authenticate the agent in response to the receiving unit receiving the connection request. In one embodiment, the agent may be a solution manager diagnostics agent and the server may be a solution manger diagnostics server. Also, the set of configuration files may include user password information and sensitive information.

The embodiments also provide an agent providing security for a set of configuration files of a remote monitoring application. The agent includes a remote monitoring application, a connection requesting unit configured to transmit a connection request, over a network, to a server storing the set of configuration files of the remote monitoring application, a receiving unit configured to receive an encryption key and the set of configuration files of the remote monitoring application, over the network, from the server, a file system configured to store a first portion of the encryption key, a memory unit configured to store a second portion of the encryption key, and a decryption unit configured to decrypt the set of configuration files using the first portion and the second portion of the encryption key in response to an access request from the remote monitoring application.

The remote monitoring application may be configured to perform one or more tasks using the decrypted set of configuration files. According to one embodiment, a memory controller may be configured to delete the second portion of the encryption key from the memory unit upon a process attack, thereby rendering the encryption key unusable.

The connection requesting unit may be configured to periodically transmit the connection request, over the network, to the server, and the receiving unit may be configured to receive a different encryption key and encrypted set of configuration files for each transmitted connection request. A frequency of the transmitted connection request may be correlated with the level of security for the set of configuration files of the remote monitoring application.

According to one embodiment, the agent may be a solution manager diagnostics agent and the server may be a solution manger diagnostics server. Also, the set of configuration files may include user password information and sensitive information.

The embodiments also provide a system for providing security for a set of configuration files. The system includes an agent having a remote monitoring application. The agent is configured to transmit a connection request over a network to a server storing the set of configuration files of the remote monitoring application. The system also includes the server configured to generate an encryption key and encrypt the set of configuration files of the remote monitoring application based on an encryption algorithm and the encryption key in response to the connection request. The server is configured to transmit the encryption key and the encrypted set of configuration files to the agent, and the agent is configured to store a first portion of the encryption key in a file system and store a second portion of the encryption key in a memory unit. Also, the agent is configured to decrypt the encrypted set of configuration files using the first portion and the second portion of the encryption key in response to an access request from the remote monitoring application.

The remote monitoring application may be configured to perform one or more tasks using the set of decrypted configuration files. Also, the agent may be configured to periodically transmit the connection request, over the network, to the server, and the server may be configured to transmit a different encryption key and set of encrypted configuration files for each connection request. A frequency of the transmitted connection request may be correlated with the level of security for the set of configuration files of the remote monitoring application. Also, the server may be configured to periodically adjust a size of the encryption key and change a type of the encryption algorithm.

The details of one or more implementations are set forth in the accompanying drawings and the description below. Other features will be apparent from the description and drawings, and from the claims.

DETAILED DESCRIPTION

Figure 1:
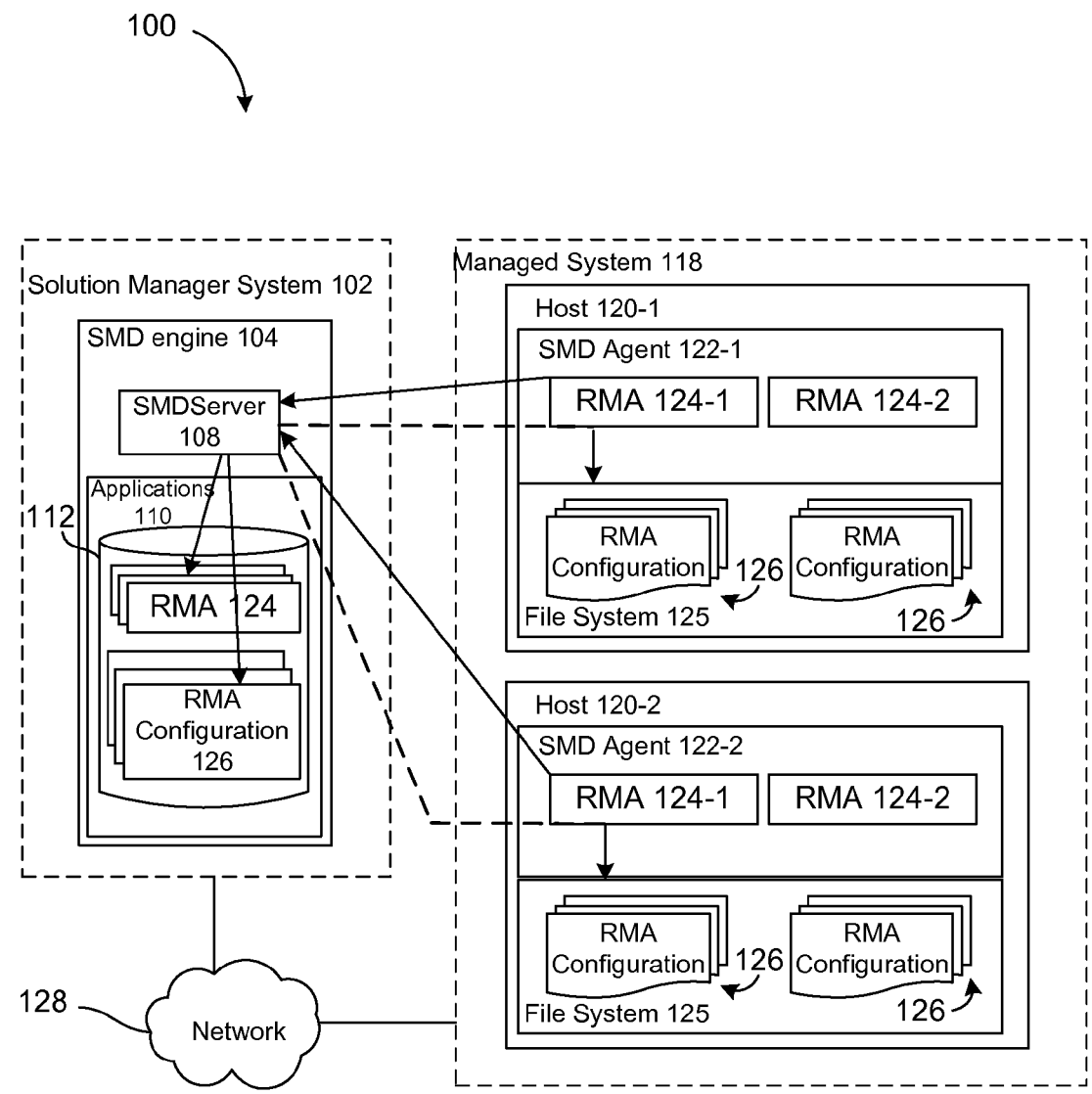
FIG. 1 illustrates a system for providing security associated with a set of configuration files of one or more remote monitoring applications according to an embodiment.

The embodiments provide a server for providing security to a set of configuration files of a remote monitoring application. In one example, the remote monitoring application may be an agelet, which is a type of plug-in application for monitoring information of a managed system, and the set of configuration files may contain sensitive information such as password information, which is used by the remote monitoring application for carrying out one or more tasks. The remote monitoring application may be part of an agent that may be connected to the server via a network using a secured connection. The server may store the set of configuration files associated with the remote monitoring application, and each time the agent connects to the server, the server may re-generate an encryption key and encrypt the set of configuration files using the encryption key, both of which is subsequently transmitted to the agent. Because the server re-generates a new encryption key and re-encrypts the configuration files using the re-generated encryption key each time the server receives a connection request, a hacker may only have a fixed amount of time to attempt to decrypt the contents of the configuration files, thereby increasing the level of security. Also, the frequency of the connection requests is configurable. As such, if it is desired to have a relatively high level of security, the frequency of the connection request may be increased, which then increases the frequency of encryption, thereby decreasing the amount of time the hacker has to decrypt the contents of the configuration files.

In addition, the embodiments encompass a method of accessing the server that is configured to provide security to the set of configuration files. In one example, the server may be accessed by performing one or more maintenance actions on the server. The one or more maintenance actions may include checking/updating the set of configuration files and/or the remote monitoring application, performing disk and file maintenance procedures, checking/updating the operating system, checking/updating a backup file system, and/or checking/updating antivirus protection. As such, the embodiments provide a mechanism of servicing or performing maintenance on the server that is configured to carry out the above described functions of receiving a connection request, generating an encryption key, transmitting the encryption key, encrypting the set of configuration files, and transmitting the set of configuration files to the agent. Therefore, despite the maintenance checks, the server is still able to provide a level of security for the configuration files.

The agent may store the encrypted configuration files, and store portions of the encryption key in different places. For example, the agent may store a first portion of the encryption key in a file system and a second portion of the encryption key in a memory unit. Thereafter, the agent may obtain the first and second portions of the encryption key, and decrypt the configuration files using the full encryption key in response to an access request from the remote monitoring application. In addition, if the remote monitoring application is subject to an attack and leads to the crash of the process, the second portion of the encryption key may be deleted from the memory unit. In other words, once the process is terminated (e.g., the normal end of the process or the process is subject to an attack), the second portion of the encryption key that was stored in the memory unit is deleted, thus rendering the first portion of the encryption key stored on the file system unusable. As a result, because the agent does not have the second portion of the encryption key, the encrypted configuration files are unusable as well. This ensures that the encrypted configuration files are completely bound to the lifetime of the process carried out by the remote monitoring application.

FIG. 1 illustrates a system 100 for providing security associated with a set of configuration files 126 of one or more remote monitoring applications (RMAs) 124 according to an embodiment. The set of configuration files 126 and the RMAs 124 may be stored in a database 112 associated with a solution manager system 102, and then subsequently transmitted to each solution diagnostics (SMD) agent 122 associated with a managed system 118. For example, as shown in FIG. 1, a SMD server 108 may obtain the RMAs 124 and the set of configuration files 126 from the database 112, and transmit the RMAs 124 and the configuration files 126 to each SMD agent 122 over a network 128. In one embodiment, after the RMAs 124 are installed on each of the SMD agents 122, the SMD agents 122 may need to access the configuration files 126 still stored in the database 112. The configuration files 126 may contain sensitive information such as password information, which the SMD agents 122 use for carrying out one or more tasks. As such, the embodiments provide a mechanism that allows each of the SMD agents 122 to receive its configurations files 126 from the database 112 associated with the SMD server 108 in a secure manner that is customizable. Generally, the embodiments provide a mechanism to encrypt the configuration files 126 on the server side each time the SMD agent 122 connects to the SMD server 108, and the encrypted configuration files 126 are transmitted to each SMD agent 122. For instance, an encryption key is generated, the configuration files 126 are encrypted using the encryption key, and then transmitted to each SMD agent 122. The encryption key maybe be split into two portions and stored in separate areas. These features are further discussed below.

The solution manager system 102 may be connected to the managed system 118 via the network 128. The network 128 may represent, for example, the public Internet or other wide area public or private network. The network 128 may represent, in further examples, a corporate or other intranet, and/or a smaller-scale, local or personal network, any of which may be implemented using standard network technology. The solution manager system 102 may represent a system that collects information from a series of agents 122 for performing a root cause analysis or for monitoring the managed system 118. The solution manager system 102 may include a solution manager Advanced Business Application Programming (ABAP) stack and a diagnostics JAVA stack having a series of WDP applications such as applications 110. As shown in FIG. 1, the solution manager system 102 may include an SMD engine 104 having the SMD server 108 for managing the RMAs 124 and its configuration files 126. Although the type of server illustrated in FIG. 1 is a solution manager diagnostics server, the server 108 may encompass any type of server well known to one of ordinary skill in the art for managing remote monitoring applications and its configuration files. The SMD server 108 is further illustrated in FIG. 2.

The managed system 118 may include a plurality of hosts 120, which are the underlying physical architectures that stores the SMD agents 122. The plurality of hosts 120 may include a first host 120-1 and a second host 120-1. Although FIG. 1 illustrates only two hosts 120 within the managed system 118, the embodiments encompass any number of hosts 120. Each host 120 may include the SMD agent 122. An SMD agent 122 may be the remote component of the root cause analysis service, and is used to collect information from the managed system 118 in order for the solution manager system 102 to perform a root cause analysis or monitor the managed system 118. Each SMD agent 122 is a JAVA process that executes a series of different applications (e.g., RMAs 124). Each of the RMAs 124 may be considered agelet. An agelet may be a type of plug-in application for monitoring information of the managed system 118. Each RMA 124 is linked to its configuration, which is the set of configuration files 126 containing the sensitive password information that is stored in the database 112 on the server-side. These configuration files 126 must be transferred to the SMD agents 122 in a secure manner. In one embodiment, the set of configuration files 126 may be common to each SMD agent 122. Also, alternatively, the configuration files 126 or a portion thereof may be customizable to a particular SMD agent 122. The set of configuration files 126 must be accessible within the file system 125 of the SMD agents 122. As such, the embodiments provide a mechanism to allow for secure transfer of the set of configuration files 126.

The SMD agent 122 may connect to the solution manager system 102 via the SMD server 108. The SMD agent 122 may collect information from the managed system 118 and report the collected information to the solution manager system 102. In one example, the first host 120-1 may include a first SMD agent 122-1, and the second host 120-2 may include a second SMD agent 122-2. However, the embodiments may encompass any number of SMD agents 122 on a particular host 120. Each SMD agent 122 may include a plurality of RMAs 124 such as a first RMA 124-1 and a second RMA 124-2, and a file system 125 that stores the decrypted configuration files 126. For example, the file system 125 may store the set of configuration files 126 for each RMA 124, as further described below. The SMD agent 122 is further illustrated in FIG. 3.

According to the embodiments, one of more of the SMD agents 122 may transmit a connection request to the SMD server 108. Upon receiving the connection request, the SMD server 108 may authenticate the SMD agent 122, generate an encryption key, and encrypt the set of configuration files 126 for each RMA 124 to be stored on the file system 125 of a respective SMD agent 122. Further, each time the SMD server 108 receives a connection request, the SMD server 108 will re-generate a new encryption key, and re-encrypt the configuration files 126. For example, after the SMD server 108 generates the encryption key and encrypts the set of configuration files 126, the SMD server 108 may transmit the encryption key and the set of encrypted configuration files to each SMD agent 122. In other words, each time the SMD agent 122 re-connects to the solution manager system 102, a new key is re-generated by the SMD server 108, and the configuration files 126 are re-encrypted and transmitted to the SMD agent 122. Once the encryption key is received at the SMD agent 122, the encryption key is split into at least two portions, where a first portion of the encryption key is stored on the file system 125 of the SMD agent 122 and a second portion of the encryption key is stored on the memory unit (e.g., memory unit 150 in FIG. 3) of the SMD agent 122. Each RMA 124 stored on a respective SMD agent 122 utilizes its configuration files 126 in order to carry out one or more tasks relating to the collection of information from the managed system 118. For example, in response to an access response request from a respective RMA 124, the SMD agent 122 may decrypt its corresponding configuration files 126 using the first and second portion of the encryption key. The RMA 124 is configured to perform one or more tasks using the decrypted set of configuration files 126.

Figure 2:
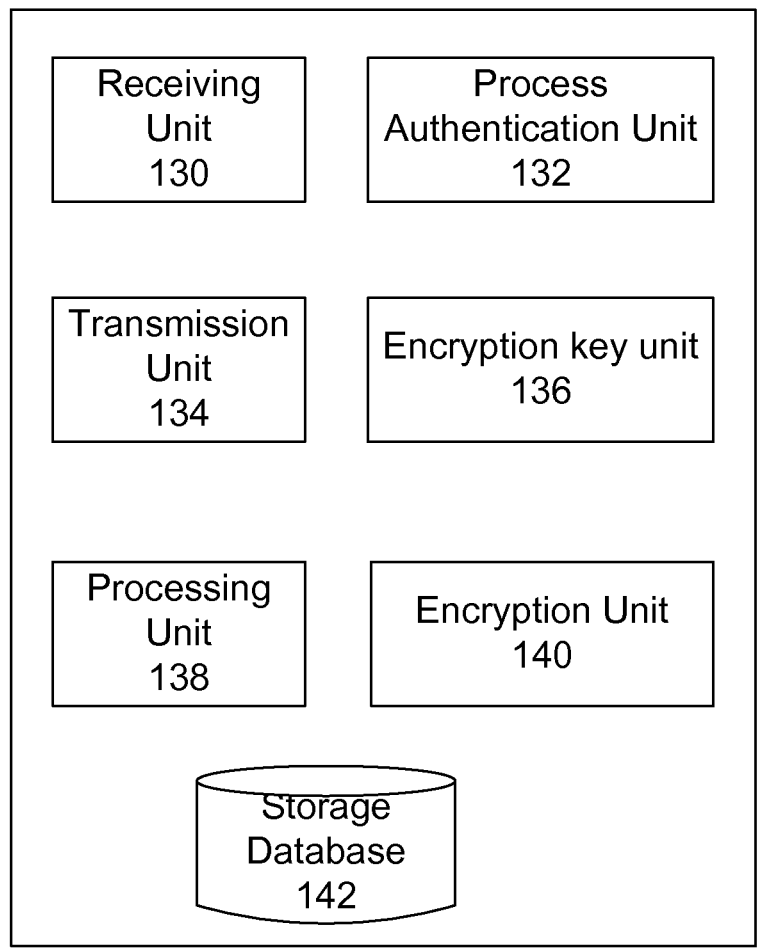
FIG. 2 illustrates a server of the system of FIG. 1 according to an embodiment.

FIG. 2 illustrates the SMD server 108 according to an embodiment. The SMD server 108 may include a receiving unit 130, a process authentication unit 132, a transmission unit 134, an encryption key unit 136, a processing unit 138, an encryption unit 140, and a storage database 142. The processing unit 138 may include one or more processors that are configured to carry out the functions of the specific units in FIG. 2. The storage database 142 may store the database 112 or a portion thereof. In addition, the storage database 142 may store other information such as computer-readable instructions for carrying out the operations of the SMD server 108. Also, the SMD server 108 may include other components that are well known to one of ordinary skill in the art.

The receiving unit 130 may be configured to receive the connection request, over the network 128, as well as any other information from the SMD server 108. The connection request may request connection to the SMD server 108. The connection request may be transmitted via a secure connection line such as a secure sockets layer (SSL) connection. For example, each time an SMD agent 122 transmits a connection request over the network 128, the receiving unit 130 may receive and process this request. Subsequently, the process authentication unit 132 is configured to authenticate the SMD agent 122 in response to the receiving unit 130 receiving the connection request. The process authentication unit 132 may authenticate the SMD agent 122 according to any types of authentication procedures that are well known in the art. The transmission unit 134 is configured to transmit the set of configuration files 126 stored in the database 112/storage database 142, and the encryption key to the SMD agent 122.

The encryption key unit 136 is configured to generate an encryption key in response to receiving the connection request, and store the encryption key in the storage database 142 or any other storage unit that stores encryption keys. For example, each time the receiving unit 130 receives the connection request, the encryption key unit 136 is configured to re-generate the encryption key. Also, for further protection, the encryption key unit 136 may be configured to periodically change the key size of the encryption key. For example, the encryption key can be changed regularly (e.g., scheduled or manually), and this policy can be centrally applied to each SMD agent 122. Subsequently, the transmission unit 134 may transmit the encryption key over the network 128 to the SMD agent 122 via the secure connection line.

The encryption unit 140 is configured to encrypt the set of configuration files 126 according to an encryption algorithm and the generated encryption key. Also, for further protection, the encryption unit 140 may be configured to periodically change the type of encryption algorithm. For example, the encryption algorithm can be changed regularly (e.g., scheduled or manually), and this policy can be centrally applied to each SMD agent 122. Because the encryption key unit 136 re-generates a new encryption key and re-encrypts the configuration files 126 each time the receiving unit 130 receives the connection request, a hacker may only have a fixed amount of time to attempt to decrypt the contents of the configuration files 126, thereby increasing the level of security.

Included in the process of generating an encryption key and encrypting the configuration files 126, the encryption key unit 136 and/or the encryption unit 140 may first negotiate a type of encryption key (e.g., its size or length) and a suitable encryption algorithm. For example, the SMD agent 122 and the SMD server 108 may be located in different locations (e.g., countries) with different security rules. As such, the SMD agent 122 and the SMD server 108 may utilize different hardware and encryption libraries for various encryption mechanisms. Therefore, encryption key unit 136 and/or the encryption unit 140 of the SMD server 108 and the SMD agent 122 (in conjunction with their respect receiving and transmission units) may transmit and receive multiple communications between each other in order to obtain a suitable encryption key and encryption algorithm according to methods that are well known to one of ordinary skill in the art. After the encryption unit 140 encrypts the configurations files 126, the transmission unit 134 may be configured to transmit the encrypted configuration files 126 to each SMD agent 122 over the network 128 via the secure connection line. After the transmission unit 134 transmits the encryption key over the network 128 to the SMD agent 122, the encryption key unit 136 is configured to delete the encryption key from the storage database 142 or any other storage unit storing the encryption key.

Figure 3:
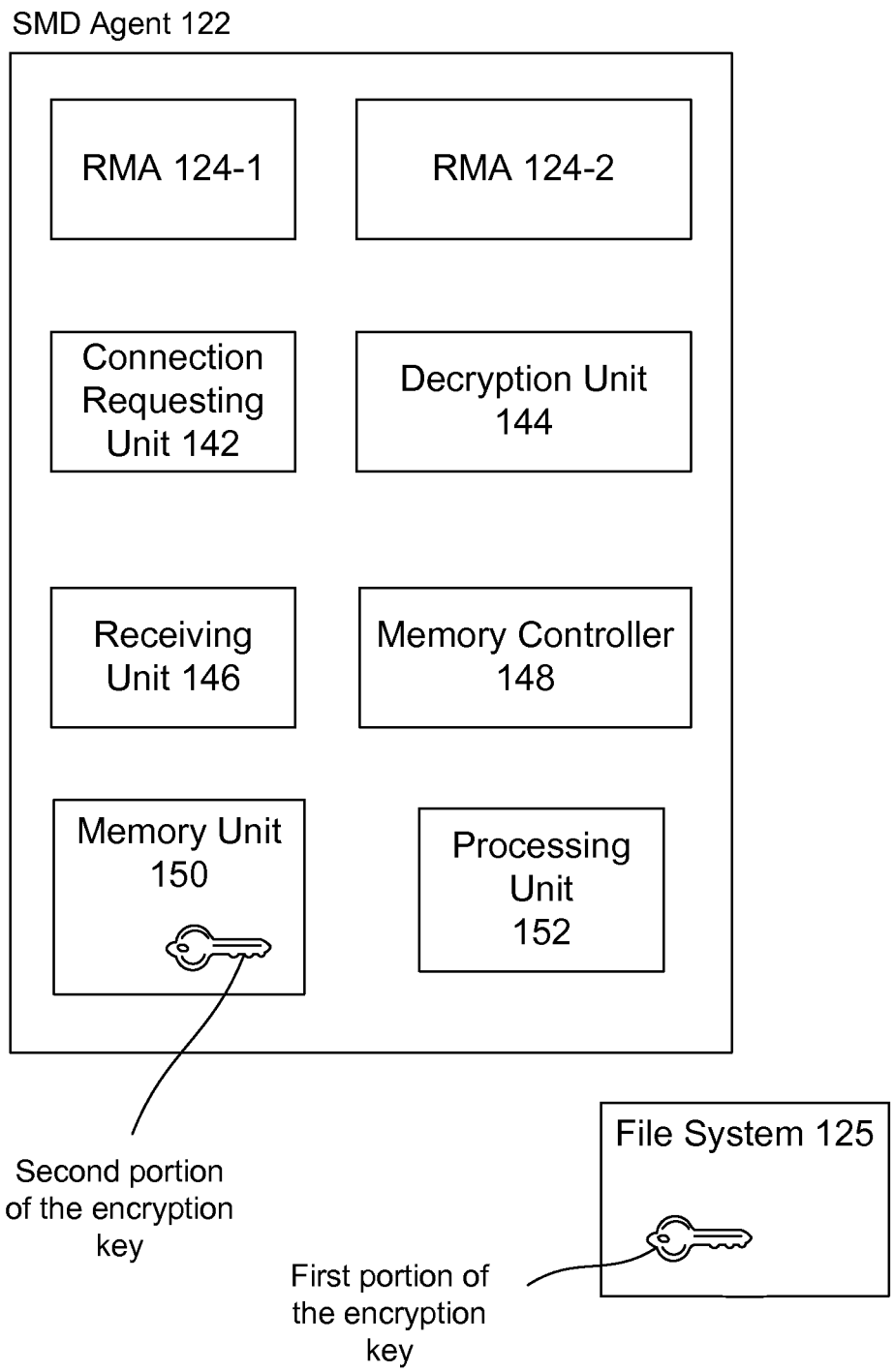
FIG. 3 illustrates an agent of the system of FIG. 1 according to an embodiment.

FIG. 3 illustrates the SMD agent 122 according to an embodiment. The SMD agent 122 may include a plurality of RMAs 124 such as the first RMA 124-1 and the second RMA 124-2, a connection requesting unit 142, a decryption unit 144, a receiving unit 146, a memory controller 148, a memory unit 150, a processing unit 152, and a file system 125. The processing unit 152 may include one or more processors that are configured to carry out the functions of the specific units in FIG. 3. In addition, the SMD agent 122 may include any other component that is well known to one of ordinary skill in the art. As indicated above, each RMA 124 may be an agelet, which is a type of plug-in application for monitoring information within the managed system 118. After the decryption unit 144 decrypts the corresponding configuration files 126 received from the SMD server 108, each RMA 124 may be configured to carry out one or more tasks related to the collection of information within the managed system 118.

The connection requesting unit 142 may be configured to transmit a connection request to the SMD server 108. For example, the connection requesting unit 142 is configured to periodically transmit the connection request, over the network 128, to the SMD server 108, and the receiving unit 146 is configured to receive a different encryption key and encrypted set of configuration files 126 for each transmitted connection request. As indicated above, the frequency of the connection requests may be configurable. As such, if it is desired to have a relatively high level of security, the frequency of the connection request may be increased, which then increases the frequency of encryption on the SMD server 108, thereby decreasing the amount of time the hacker has to decrypt the contents of the configuration files 126. As such, the frequency of the transmitted connection request is correlated with the level of security for the set of configurations 126 for the RMAs 124.

The receiving unit 146 may be configured to receive the encryption key and the set of encrypted configuration files 126 from the SMD server 108 over the network 128 in response to each connection request issued by the connection requesting unit 142. The memory controller 148 may control where information received from the receiving unit 146 is stored. For example, according to an embodiment, the memory controller 148 may store a first portion of the encryption key in the file system 125, and may store a second portion of the encryption key in the memory unit 150. Also, the memory controller 148 may store the set of configuration files 126 in the file system 125, the memory unit 150, and/or any other storage unit for holding the set of encrypted configuration files 126 until the decryption unit 144 decrypts the configuration files 126.

The decryption unit 144 is configured to decrypt the set of configuration files 126 using the first portion and the second portion of the encryption key in response to an access request from a respective RMA 124. For example, the RMA 124 may prompt the decryption unit 144 to decrypt the set of configuration files 126, which the decryption unit 144 obtains the first portion of the encryption key from the file system 125 and the second portion of the encryption key from the memory unit 150, and decrypts the set of configuration files 126 using both the first portion and the second portion of the encryption key. Subsequently, the respective RMA 124 performs one or more tasks using the decrypted set of configuration files 126. Upon completion of the one or more tasks, the memory controller 148 is configured to delete the second portion of the encryption key from the memory unit 150, thereby rendering the encryption key unusable. Alternatively, if one or more of the tasks of the RMA 124 is uninterrupted by a process attack, the memory controller 148 is configured to delete the second portion (or the memory unit 150 will be deleted by its operating system when the process is stopped abnormally) of the encryption key from the memory unit 150, thereby rendering the encryption key unusable.

As indicated above, the server may be accessed in the course of providing routine maintenance and/or accessed during the course of runtime operations. In one example, the server may be accessed by performing one or more maintenance actions on the server. The one or more maintenance actions may include checking/updating the set of configuration files and/or the remote monitoring application, performing disk and file maintenance procedures, checking/updating the operating system, checking/updating a backup file system, and/or checking/updating antivirus protection. However, the embodiments encompass any type of maintenance action known to one of ordinary skill in the art. As such, the embodiments provide a mechanism of servicing or performing maintenance on the server that is configured to carry out the processes, as further explained with reference to FIG. 4A.

Figure 4A:
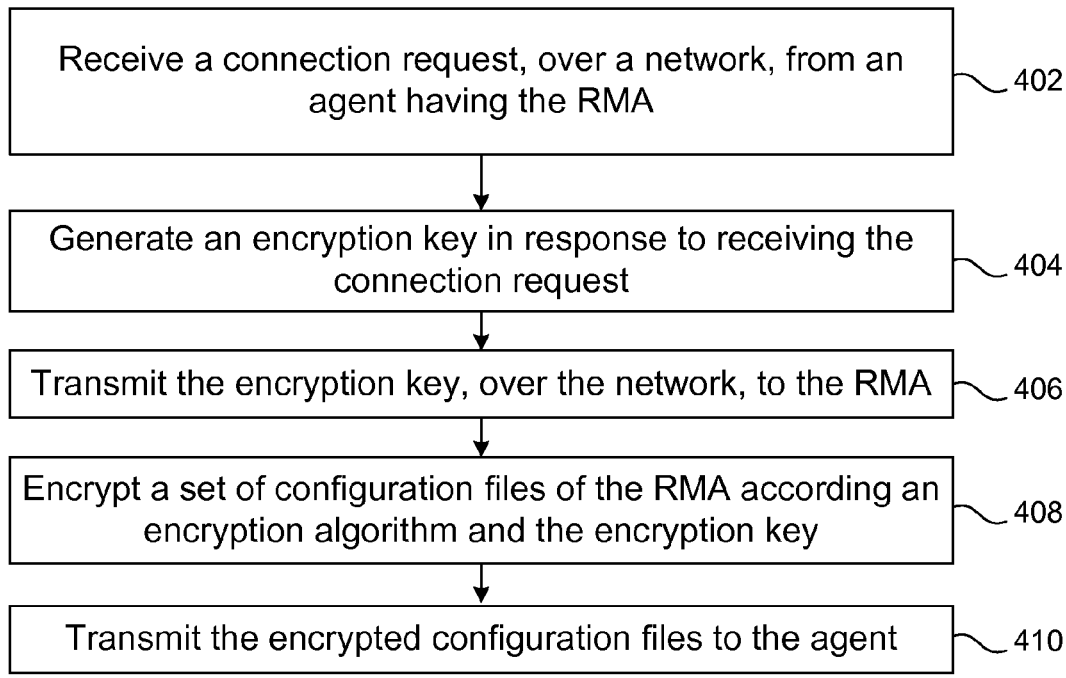
FIG. 4A is a flowchart illustrating example operations of the system of FIG. 1 and the server of FIG. 2 according to an embodiment.

FIG. 4A is a flowchart illustrating example operations of the system 100 of FIG. 1 and the server of FIG. 2. Although the flowchart of FIG. 4A illustrates the operations in sequential order, it will be appreciated that this is merely an example, and that additional or alternative operations may be included. Further, operations of FIG. 4A and related operations may be executed in a different order than that shown, or in a parallel or overlapping fashion.

When the SMD agent 122 starts, the SMD agent 122 will attempt to establish a connection to the SMD server 108 to retrieve the new binaries and configuration files of the RMAs 124. A connection request may be received over the network from the agent (402). For example, the receiving unit 130 of the SMD server 108 may receive the connection request over the network 128 from the SMD agent 122 having the RMAs 124. Also, in one embodiment, the SMD server 108 may periodically request the SMD agent to reconnect—to update the encryption key and algorithm. The frequency of the reconnection request may be configurable, where a level of security is correlated with the frequency of the connection requests.

An encryption key may be generated in response to receiving the connection request (404). For example, the encryption key unit 136 may generate the encryption key in response to receiving the connection request. In one example, the encryption key unit 136 may first negotiate a type of encryption key (e.g., its size or length). For example, the SMD agent 122 and the SMD server 108 may be located in different locations (e.g., countries) with different security rules. As such, the SMD agent 122 and the encryption key unit 136 of the SMD server 108 may utilize different hardware and encryption libraries for various encryption mechanisms. Therefore, encryption key unit 136 of the SMD server 108 and the SMD agent 122 (in conjunction with their respect receiving and transmission units) may transmit and receive multiple communications between each other in order to obtain a suitable encryption key according to methods that are well known to one of ordinary skill in the art.

The encryption key may be transmitted, over a network, to the remote monitoring application (406). For example, the transmission unit 134 may transmit the encryption key to the SMD agent 122 over the network 128 using a secure connection line.

A set of configuration files of the remote monitoring application may be encrypted according to an encryption algorithm and the encryption key (408). For example, the encryption unit 140 may access the database 112 storing the set of configuration files 126, and encrypt the set of configuration files 126 using the encryption key generated in 408 and an encryption algorithm. In one example, the encryption unit 140 may first negotiate a suitable encryption algorithm. The encryption unit 140 of the SMD server 108 and the SMD agent 122 (in conjunction with their respect receiving and transmission units) may transmit and receive multiple communications between each other in order to obtain a suitable encryption algorithm according to methods that are well known to one of ordinary skill in the art.

The encrypted configuration files may be transmitted to the agent (410). For example, the transmission unit 134 may transmit the encrypted configuration files 126 to the SMD agent 122.

Figure 4B:
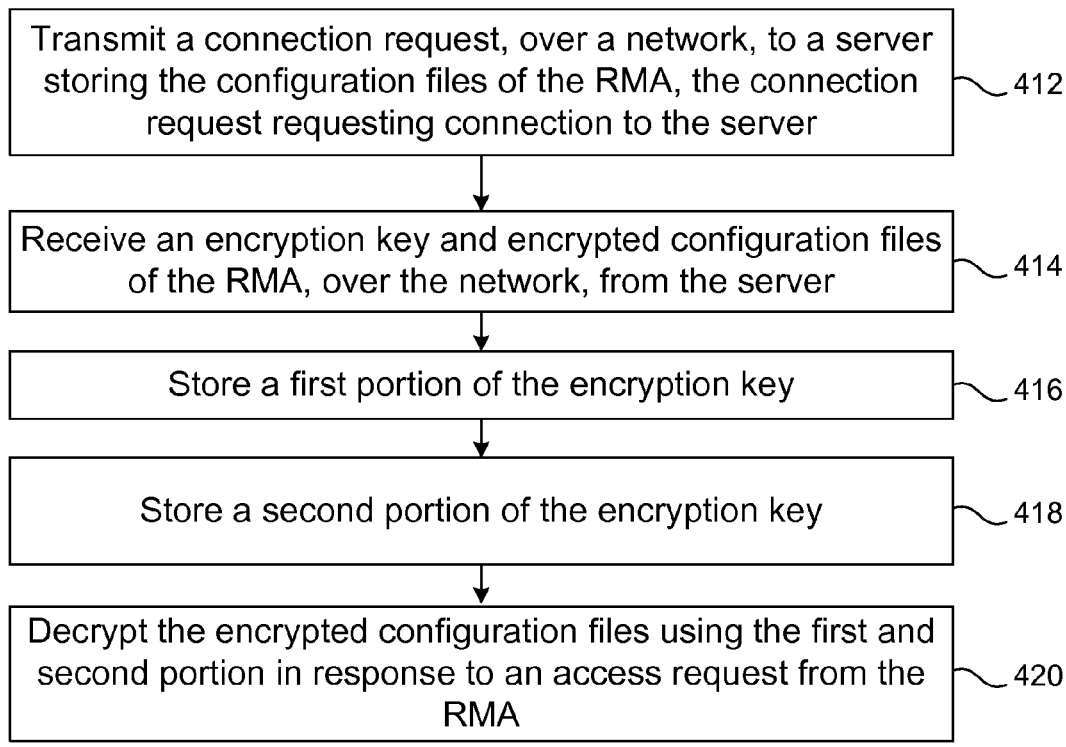
FIG. 4B is a flowchart illustrating example operations of the system of FIG. 1 and the agent of FIG. 3 according to an embodiment.

FIG. 4B is a flowchart illustrating example operations of the system 100 of FIG. 1 and the agent of FIG. 3. Although the flowchart of FIG. 4B illustrates the operations in sequential order, it will be appreciated that this is merely an example, and that additional or alternative operations may be included. Further, operations of FIG. 4B and related operations may be executed in a different order than that shown, or in a parallel or overlapping fashion.

A connection request may be transmitted over the network from a server storing the configuration files of the remote monitoring application (412). For example, a connection requesting unit 142 of the SMD agent 122 may transmit a connection request over the network 128 to the SMD server 108. As indicated above, the connection requesting unit 142 may be configured to periodically transmit the connection request, where a frequency of transmitting the connection request is configurable.

An encryption key and encrypted configuration files may be received over the network from the server (414). For example, the receiving unit 146 of the SMD agent 122 may receive the encryption key and the encrypted configuration files 126 over the network 128 from the SMD server 108. The receiving unit 146 may receive the encryption key and the encrypted configuration files 126 via a secure connection line.

A first portion of the encryption key may be stored (416) and a second portion of the encryption key may be stored (418). For example, the memory controller 148 of the SMD agent 122 may split the encryption key into two portions—a first portion and a second portion. The memory controller 148 may store the first portion of the encryption key in the file system 125, and may store the second portion of the encryption key in the memory unit 150.

The encrypted configuration files may be decrypted using the first and second portion in response to an access request from the remote monitoring application (420). For example, the RMA 124 may initiate its collection tasks by sending an access request to the decryption unit 144 to decrypt its encrypted configuration files 126. As such, the decryption unit 144 is configured to re-assemble the first portion and the second portion to obtain the full encryption key. Subsequently, the decryption unit 144 is configured to decrypt the configuration files 126 according to decryption mechanisms that are well known to one of ordinary skill in the art.

Figure 5:
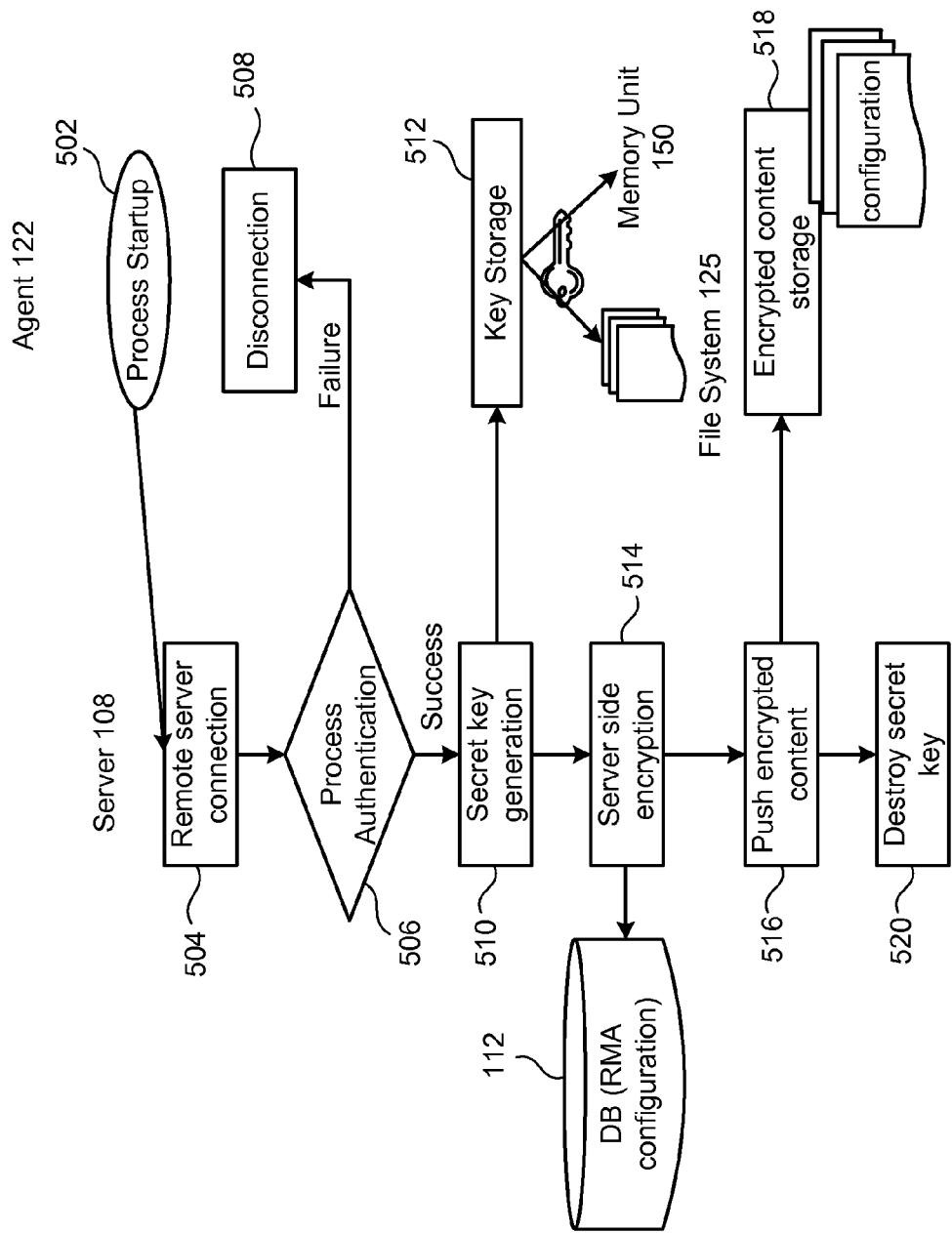
FIG. 5 illustrates a flow chart depicting example operations of providing a security associated with the set of configuration files of the remote monitoring application according to an embodiment.

FIG. 5 illustrates a flow chart depicting example operations of providing a level of security associated with a set of configuration files 126 of a remote monitoring application 124 according to an embodiment. Although the flowchart of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion.

The file transfer process is started (502), and the SMD server 108 is configured to receive a connection request from the SMD agent 122 (504). The SMD agent 122 may be authenticated according to methods that are well known in the art (506), and if the authentication process is successful, the SMD server 108 is configured to generate the encryption key (510). Subsequently, the SMD server 108 may be configured to transmit the encryption key to the key storage (512). For example, the SMD server 108 may be configured to transmit the encryption key over the network 128 to the SMD agent 122 via the secure connection line. Subsequently, the SMD agent 122 may be configured to store the first portion of the encryption key in the file system 125, and the second portion of the encryption key in the memory unit 150. Referring back to the server side, the SMD server 108 may encrypt the configuration files 126 from the database 112 using the encryption key (514), and then subsequently transmit the encrypted configuration files 126 to the agent 122 (516, 518). After the encryption key and the encrypted configuration files are sent to the SMD agent 122, the SMD server 108 may delete the encryption key (520).

Figure 6:
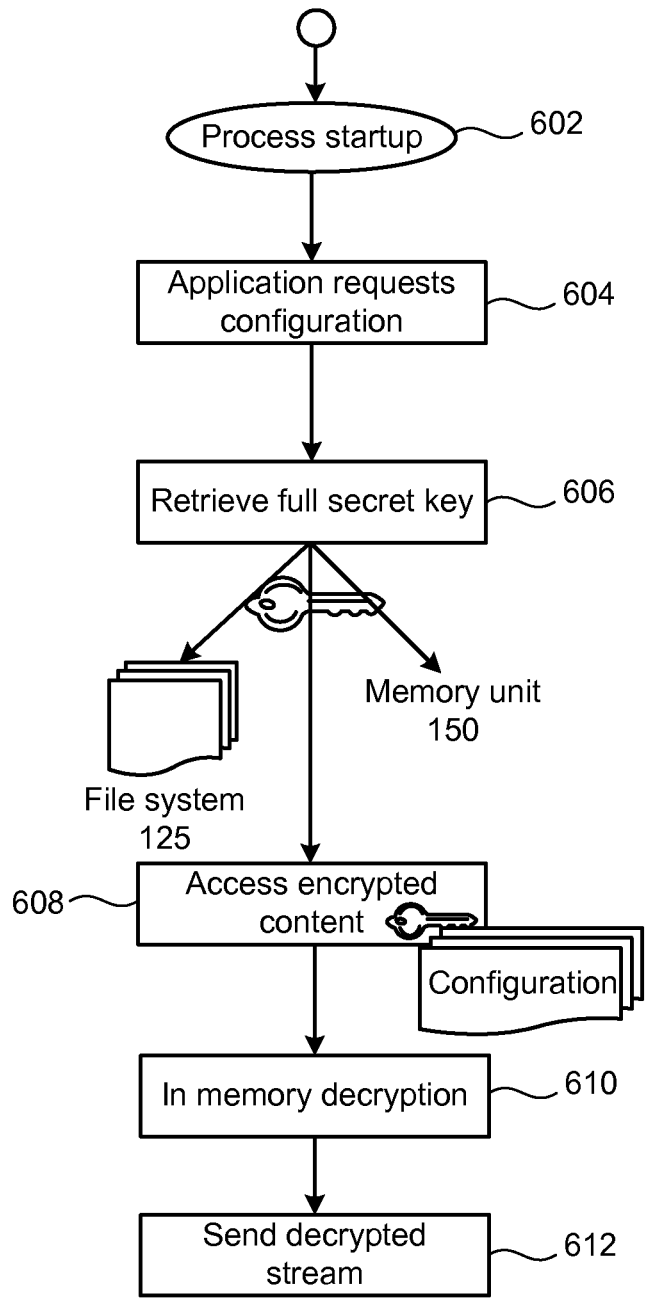
FIG. 6 illustrates a flow chart depicting example operations of decrypting the configuration files according to an embodiment.

FIG. 6 illustrates a flow chart depicting example operations of decrypting the configuration files 126 according to an embodiment. Although the flowchart of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion.

After a task is started (602), the RMA 124 requests its configuration files 126 (604), which issues an access request response to the decryption unit 144. The decryption unit 144 retrieves the full encryption key from the file system 125 and the memory unit 150 by re-assembling the first portion stored in the file system 125 and the second portion stored in the memory unit 150 (606). Subsequently, the decryption unit 144 accesses the encrypted content of the configuration files 126 (608), and decrypts the encrypted configuration files 126 (610). The decryption unit 144 may send the decrypted configurations 126 to the appropriate place for storage such as the file system 125 (612).

Figure 7:
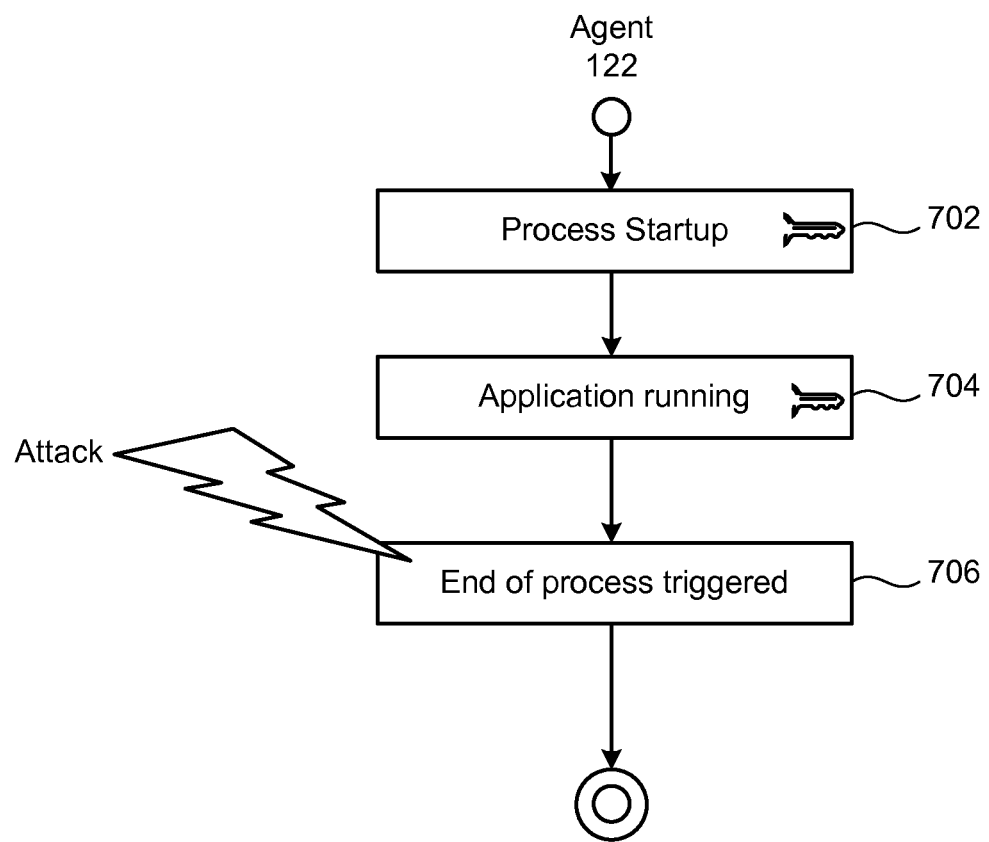
FIG. 7 illustrates a flow chart depicting example operating of carrying out one process by the remote monitoring application according to an embodiment.

FIG. 7 illustrates a flow chart depicting example operating of carrying out one process by the RMA 124 according to an embodiment. Although the flowchart of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion.

After a task is started (702), the RMA 124 may be executing one or more tasks corresponding to its decrypted configuration files 126 (704). The one or more tasks may be terminated by the completion of the one or more tasks or by a process attack (706). If the SMD agent's process (e.g., process executed by its operating system) is uninterrupted by a process attack or stopped, the memory controller 148 is configured to delete the second portion of the encryption key from the memory unit 150, thereby rendering the encryption key unusable. Alternatively, the operating system will delete the memory contents once the process is stopped or terminated.

Generally, the embodiments encompass a mechanism that re-encrypts configuration files on the server side and transmits the encrypted configuration files each time an agent transmits a connection request. The frequency of the agent reconnection is customizable which makes the level of security of encryption customizable (e.g., at each agent connection a new key will be re-generated). As a result, a hacker will have a fixed amount of time to try decrypting the contents of the configuration files. The encryption algorithm can be change on the fly without restart of a solution manager restart during the next reconnection of agents.

The fact that the configuration files are maintained centrally makes the administration the configuration files relatively easier. For example, if a new file is added to the configuration files, the new set of configuration files may be transmitted to each agent. Also, if the administrator wants to enforce a higher encryption level and increase the encryption key size, the administrator can adjust the encryption key accordingly and transmit the new encryption key and encrypted configuration files to each agent. The encryption key on the agent side may be stored half in memory, half on the file system. The validity of the encrypted content may be then bound to the lifetime of the agent (e.g., an unexpected crash of the process renders the encrypted content unusable because the part of the encryption key stored in memory has been deleted, thus rendering the encryption key invalid). Also, by splitting the encryption key into multiple portions, it is more difficult for a hacker to retrieve to full encryption key. During the restart of process or reconnection to the server, the configuration files will be re-encrypted with a new encryption key, and the previous configuration files on the file system will be overwritten. In addition, despite any type of maintenance action, the server still may maintain a level of security provided to the configuration files.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for providing security for a set of configuration files, the method comprising:
    periodically receiving, by a server, a connection request, over a network, from a host computer having an agent with a remote monitoring application configured to monitor performance of the host computer, the server storing one or more configuration files containing password information required by the agent to perform one or more tasks;
    generating, by the server, an encryption key in response to receiving the connection request;
    encrypting, by the server, the configuration files according to an encryption algorithm and the encryption key;
    transmitting, by the server, the encryption key and the encrypted configuration files, over the network, to the agent;
    deleting the encryption key after transmitting the encrypted configuration files,
    wherein the encryption key is re-generated, the configuration files are re-encrypted, and the re-generated encryption key and the re-encrypted configuration files are transmitted to the agent each time the connection request is received; and
    increasing, by the server, a level of security for the configuration files by increasing a frequency in which a connection request is generated such that a different encryption key is re-generated and the configuration file are re-encrypted and transmitted at a faster rate than before the level of security was increased.

2. The method of claim 1, wherein the connection request is received over a secure sockets layer (SSL) connection, and the method further comprises:
    authenticating the agent each time the connection request is received.

3. The method of claim 1, wherein the server is a solution manager diagnostics server.

4. The method of claim 1, further comprising:
    periodically changing a type of the encryption algorithm and a key size of the encryption key.

5. The method of claim 1, wherein the server and the agent are located in different locations with different security rules.

6. The method of claim 1, wherein the agent is a remote component of a root cause analysis service.

7. An agent installed on a host computer, the agent comprising:
    a remote monitoring application configured to monitor performance of the host computer;
    a connection requesting unit configured to periodically transmit a connection request, over a network, to a server storing one or more configuration files required by the remote monitoring application to perform one or more tasks, the connection request requesting connection to the server, the one or more configuration files including password information required by the agent to perform a collection task;
    a receiving unit configured to receive an encryption key and encrypted configuration files, over the network, from the server, the encrypted configuration files having been encrypted with the encryption key;
    a memory controller configured to split the encryption key into a first portion and a second portion;
    a file system configured to store the first portion of the encryption key;
    a memory unit configured to store the second portion of the encryption key, wherein the remote monitoring application is configured to initiate the collection task; and
    a decryption unit configured to, in response to the initiation of the collection task, re-assembly the encryption key using the first portion and the second portion, and decrypt the configuration files using the re-assembled encryption key such that the agent is authenticated using the password information from the decrypted configuration files, the decryption unit configured to delete the second portion of the decryption key upon completion of the collection task, thereby rendering the encryption key unusable,
    wherein the receiving unit is configured to re-receive a new encryption key and re-encrypted configuration files in response to each transmitted connection request.

8. The agent of claim 7, wherein the remote monitoring application configured to perform the one or more tasks using the decrypted configuration files.

9. The agent of claim 7,
    wherein the memory controller is configured to also delete the second portion of the encryption key from the memory unit upon a process attack, thereby rendering the encryption key unusable.

10. The agent of claim 7, wherein the connection request is transmitted over a secure connection line.

11. The agent of claim 7, wherein a frequency of receiving new encryption keys and re-encrypted configuration files is correlated with a level of security for the configuration files of the remote monitoring application.

12. The agent of claim 7, wherein the agent is a solution manager diagnostics agent and the server is a solution manger diagnostics server.

13. The agent of claim 7, wherein the connection requesting unit is configured to increase a frequency in which a connection request is generated in order to increase a level of security such that the encryption key is re-generated and the configuration file are re-encrypted and transmitted at a faster rate than before the level of security was increased.

14. A non-transitory computer-readable medium storing executable instructions, that when executed by the at least one processor, are configured to:
   periodically receive a connection request by a server, over a network, from a host computer having an agent with a remote monitoring application configured to monitor performance of the host computer, the server storing one or more configuration files containing password information required by the agent to perform one or more tasks;
   generate an encryption key in response to receiving the connection request;
   encrypt the configuration files according to an encryption algorithm and the encryption key;
   transmit the encryption key and the encrypted configuration files, over the network, to the agent,
   wherein the encryption key is re-generated, the configuration files are re-encrypted, and the re-generated encryption key and the re-encrypted configuration files are transmitted to the agent each time the connection request is received;
   store a first portion of the encryption key in a first storage location of the agent;
   store a second portion of the encryption key in a second storage location of the agent, the second storage location being different than the first storage location;
   decrypt at least one configuration file using the encryption key in response to an access request from the remote monitoring application;
   authenticate the agent using the password information of the decrypted at least one configuration file;
   delete the second portion of the encryption key from the second storage location after the one or more tasks are completed by the agent; and
   increase, by the server, a level of security for the configuration files by increasing a frequency in which a connection request is generated such that a different encryption key is re-generated and the configuration file are re-encrypted and transmitted at a faster rate than before the level of security was increased.

15. The non-transitory computer-readable medium of claim 14, wherein the executable instructions include instructions to:
   authenticate the agent each time the connection request is received.

16. The system of claim 14, wherein the executable instructions include instructions to:
   periodically adjust a size of the encryption key and change a type of the encryption algorithm.

* * * * *